Oct. 11, 1966  F. F. JARAY  3,278,282
GLASS SPINNING CRUCIBLE
Filed Oct. 23, 1963
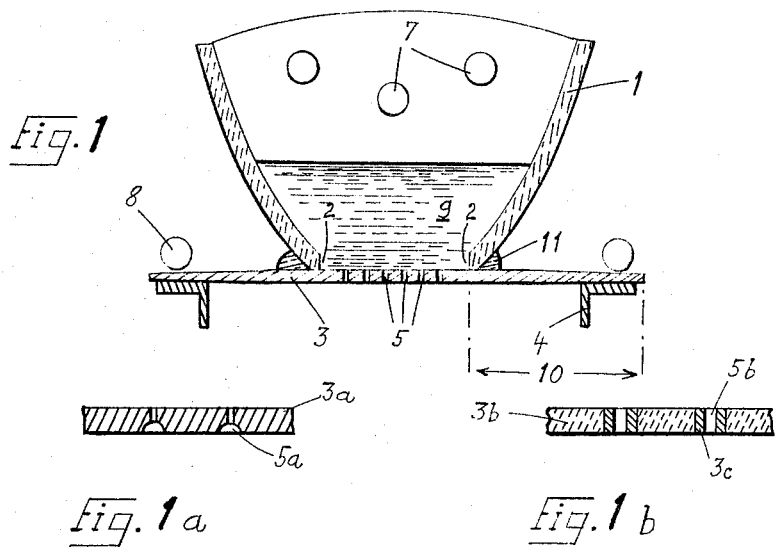
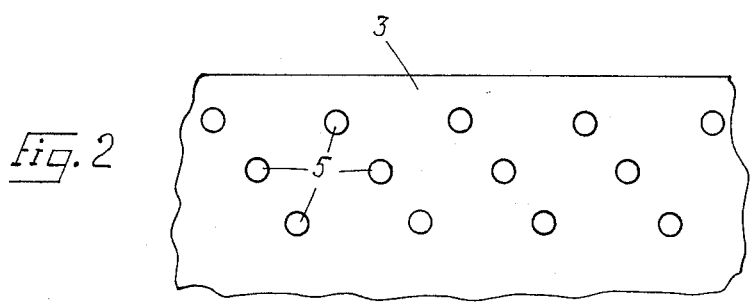
INVENTOR:
Francis Ferdinand Jaray

United States Patent Office 3,278,282
Patented Oct. 11, 1966

3,278,282
GLASS SPINNING CRUCIBLE
Francis Ferdinand Jaray, 6 Sansome Place,
Worcester, England
Filed Oct. 23, 1963, Ser. No. 318,236
10 Claims. (Cl. 65—1)

This invention relates to glass-spinning crucibles for the production of glass fibers.

It is customary to produce glass fibers by drawing molten glass through small perforations formed in the bottom of a crucible of platinum or other refractory material and such materials are not only expensive to manufacture, but they also suffer from the disadvantage that erosion of either the body or the perforated parts of the crucible renders the whole crucible useless.

It has been proposed to have a crucible comprising a ceramic body part and a metal drawbar which is cemented to the body part. However, in view of the differential thermal expansion, such an arrangement is not satisfactory, particularly if a drawbar of more than about 8 or 10 inches is used. It will be appreciated that fracture of the cement joint or even the crucible body part would lead to flooding with molten glass of at least the underside of the drawbar.

It is an object of the invention to provide a glass-spinning crucible which is cheap to manufacture and is economical in use.

According to the present invention, there is provided a glass-spinning crucible comprising a body portion open at both top and bottom and a perforated bottom plate, upon which the open bottom of the body portion rests, sealing off the body portion and bottom plate being effected by contact therebetween and/or by solidification of glass escaping through the joint therebetween. Not only does the solidified glass act as a seal, but the escaping liquid glass acts to facilitate relative movements due to differential thermal expansion.

Preferably, the bottom plate extends beyond the open bottom of the body portion, so that any escaping glass will flow along the upper face of the plate and will freeze before it can reach the underface and interfere with the spinning operation. Preferably also, the extending part of the plate is of reduced thickness to minimize heat losses. It may be advantageous to dispose cooling pipes at that part of the bottom plate which extends beyond the body portion, so that any molten glass which escapes through the seal between the body portion and the bottom plate will be solidified to provide and maintain a substantially leak-proof seal.

A preferred form of the invention utilizes a crucible having a body portion in the form of a trough which tapers toward the open bottom end, thereof. The crucible body portion may be made from highly refractory material such as sillimanite, sintered aluminium or zirconium or heat resistant alloys.

Suitably, the heating of the glass within the crucible is effected by means of radiant heating elements mounted within the body portion above the level which the glass will reach therein. In this arrangement, the radiant heating elements are out of contact with the molten glass, and consequently are not subjected to erosion by the action of the flowing glass.

Thus it is possible to feed the crucible with glass in any form that may be convenient; for example: liquid glass may be fed to the crucible, or glass frit, marbles or rods may be used, the use of the latter being particularly advantageous since they can be fed automatically into the crucible to maintain a substantially constant glass level therein. The ends of the element are extended through the ends of the crucible to provide cool connections for the cables.

In a preferred arrangement, further heat is supplied to the molten glass by means of an electric current fed to the bottom plate. This is of great advantage, since in earlier proposals the necessarily high temperature of the drawbar was maintained by controlling the temperature of the molten glass and, as substantial heat is lost by radiation from the drawbar, extremely high glass temperatures were involved. In the case of an alkali glass the temperature may approach the limits of suitability of radiant heat electric elements and also the high temperature glass will tend to attack the crucible material. For example, if the drawbar temperature is to be 1,000° C., the glass temperature in earlier proposals would require to be around 1250° C., and if the drawbar temperature were 1100° C., the glass would require to be at 1400 to 1500° C. In the present arrangement, the temperature of the bottom plate can be similar to, possibly only slightly higher than the glass temperature. Thus, the glass temperature need not be raised to unsatisfactory levels, a fact which prolongs the life of the crucible and reduces the consumption of electrical power during the spinning operation; also, the temperatures of the glass and of the bottom plate can be controlled independently.

It will be appreciated that, with the construction according to the invention, the bottom or "drawing" plate is exchangeable and can be changed whenever it is worn through erosion due to the flowing glass or, alternatively, it can be exchanged for the production of thicker or thinner glass fibers which require holes of different size in the bottom plate.

The bottom plate can be made from a refractory metal such as chromium, iron, and nickel alloys, platinum, or molybdenum. In the case of molybdenum and other heat resisting materials which are likely to be oxidized by the surrounding air, it is advisable to cover the underside of the bottom plate with a thin foil of platinum. Alternatively, the bottom plate can be made from a ceramic material; in this case, if the plate is to be electrically heated, a semi-conductor, such as carbon silicide, must be employed. Moreover, when the crucible parts are nearly worn out, they can be removed from the main structure of the spinning plant, leaving the heating element in position and then replaced for immediate resumption of operation.

Suitably the perforations in the bottom plate are disposed in a number of parallel rows, the perforations in said rows being staggered in relation to each other, so that, when viewed from a position transversely of the length of the rows the individual perforations in the rows appear to be equally spaced apart in a single row. By adopting this arrangement, the individual glass fiber being formed at each of the perforations do not interfere with one another in connection with the action of the spinning wheel.

The bottom plate, when formed of metal, is preferably formed in circular recesses in the under-surface thereof surrounding each of the perforations in order to prevent glass from running across the bottom of the plate and interfering with the individual glass streams coming through adjacent perforations.

Alternatively, the bottom plate may be formed of ceramic material, the material being provided by hollow metal inserts disposed therein, for example by providing nipples screwed or otherwise fixed into the bottom plate; the nipples may be made from or coated with platinum in order to minimize erosion by the flowing glass.

Although preference has been expressed for the use of internally disposed radiant heating elements, the invention is not limited to such a disposition of heating elements and the use of externally-arranged heating elements, especially rod-type elements, has the advantage that it becomes possible to take the terminals into the open air where they can be fixed to the feeding cables without difficulty and thus avoid the complications of having to use water-cooled electrodes and terminals.

The height of the crucible can be arranged as necessary and may be greater than that of existing glass spinning crucibles, and thus a substantial zone may exist for clearing the molten glass and freeing it from air bubbles and other impurities before entering the perforations; also, the output which is in proportion to the hydrostatic head of the glass above the bottom can be increased. The present design combines versatility and simplicity of operation with low capital costs and running expenditure, and promotes the production of consistent articles at economical cost.

In order to maintain a seal between the two contacting surfaces of the crucible body portion and the bottom plate, the surfaces should be ground or otherwise formed so as to provide for a seal and, while clamping devices may be employed, the simplest arrangement is one in which the bottom plate is supported from below with the crucible body portion resting upon it, the weight of the body portion and its contents usually being found to provide sufficient pressure to provide a liquid-tight seal.

One example of the spinning crucible according to the invention is described in the drawings in which FIGURE 1 shows a cross section of a spinning crucible and FIGURE 2 shows a partial view of the drawbar. As can be seen from FIGURES 1 and 2, the spinning crucible consists in a ceramic pot 1 which is shaped like a trough which is open at the top and at the bottom—the lower edge 2 of the trough rests on the upper surface of the drawbar 3 which is made from metal and has perforations or nipples 5. The drawbar 3 is supported by the supports 4, the crucible itself stands on the drawbar and presses with its own weight and the weight of the melted glass 9 on the drawbar 3.

The heating elements 7 are arranged inside the spinning crucible; they heat the glass by radiant heat and are arranged above the level of the molten glass 9.

The terminals for the electric current are made from metal and are welded to the drawbar 3 and are connected to electric cables (not shown). During the process of spinning an electric current which may be either direct, or low or high frequency alternating current, is passed through the terminals and the drawbar and thus effects the heating of the drawbar.

The drawbar 3 protrudes beyond the lower end of the trough 1 and the protruding part 10 may show a reduced thickness towards the outer circumference to reduce the heat losses of the drawbar. For instance, the drawbar can have a thickness of 5 mm. and the protruding part 10 can be reduced down to 1 mm. Similarly, it is possible to arrange cooling pipes 8 which carry cooling water to insure the congealing of any quantities of liquid glass which may have penetrated through the joint between the lower side of the trough 1 and the drawbar 3; the percolated glass as shown at 11 will congeal and will form a deformable seal.

FIGURE 2 is a plan view of the drawbar and shows the arrangement of the perforations or nipples in the drawbar 3 and as can be seen from it the perforations in the individual rows are arranged so in relation to each other that when seen from the side the perforations appear as if they were arranged in a single row at equal distance from each other. In this way it is achieved that the emerging glass currents or drops 11 will not interfere with each other, and additionally increase the strength of the drawbar.

What is claimed is:

1. A glass-spinning crucible comprising a body portion open at both top and bottom, and a perforated bottom plate upon which the open bottom of the body portion rests, sealing of the body portion and bottom plate being effected by contact therebetween and solidification of glass escaping through the joint therebetween.

2. A glass-spinning crucible according to claim 1, wherein the bottom plate extends beyond the open bottom of the body portion.

3. A glass-spinning crucible according to claim 2, in which the extending part of the bottom plate is of reduced thickness to reduce heat loss from the plate.

4. A glass-spinning crucible according to claim 2, wherein cooling pipes are arranged to effect cooling of the extending part of the bottom plate.

5. A glass-spinning crucible according to claim 1, in which said bottom plate comprises an electrically conducting or semi-conducting material and means are provided for supplying electric power to the plate to effect heating of the same.

6. A glass-spinning crucible according to claim 1, wherein the body portion is formed as an elongated trough.

7. A glass-spinning crucible according to claim 1, wherein radiant heating elements are mounted within the body portion above the level of glass contained therein.

8. A glass-spinning crucible according to claim 1, wherein the perforations in the bottom plate are disposed in a number of parallel rows, the perforations in said rows being staggered in relation to one another, so that, when viewed from a position transversely, of the length of the rows, the perforations appear to be equally spaced apart.

9. A glass-spinning crucible according to claim 1, wherein the bottom plate is formed with circular recesses in the under-surface thereof surrounding each of the perforations.

10. A glass-spinning crucible according to claim 1, wherein the bottom plate is formed of ceramic material, the perforations being provided by hollow metal inserts disposed therein.

References Cited by the Examiner
UNITED STATES PATENTS

| | | | |
|---|---|---|---|
| 1,034,824 | 8/1912 | Owens | 65—337 |
| 2,042,560 | 6/1936 | Stewart | 65—355 |
| 2,077,705 | 4/1937 | McKelvey et al. | 65—355 |
| 2,323,000 | 6/1943 | Auwarter et al. | 65—1 |
| 2,777,254 | 1/1957 | Siefert et al. | 65—324 |
| 3,125,329 | 3/1964 | McFadden | 18—8 |

DONALL H. SYLVESTER, *Primary Examiner.*

R. L. LINDSAY, *Assistant Examiner.*